United States Patent [19]

Robecchi et al.

[11] Patent Number: 4,708,702
[45] Date of Patent: Nov. 24, 1987

[54] V-BELT OF CONTROLLED EXTENSIBILITY AND RELATIVE TRANSMISSION

[75] Inventors: Edoardo Robecchi, Sesto S. Giovanni; Renato Dell'Orto, Seregno, both of Italy

[73] Assignee: Industrie Pirelli S.p.A., Italy

[21] Appl. No.: 883,365

[22] Filed: Jul. 8, 1986

[51] Int. Cl.[4] .............................................. F16G 5/08
[52] U.S. Cl. .................................... 474/261; 474/263
[58] Field of Search ................................ 474/261–265

[56] References Cited

U.S. PATENT DOCUMENTS 3,416,383 12/1968 Jensen et al. ................... 474/261 X
3,616,832 11/1971 Takeoshima et al. ........... 474/263 X
3,992,958 11/1976 Bonnefon ........................ 474/263 X
4,027,545 6/1977 White, Jr. .
4,127,039 11/1978 Hollaway, Jr. .

FOREIGN PATENT DOCUMENTS 2827706 1/1980 Fed. Rep. of Germany .
2711637 2/1980 Fed. Rep. of Germany .

Primary Examiner—Stephen J. Novosad
Assistant Examiner—Thuy M. Bui
Attorney, Agent, or Firm—Stevens, Davis, Miller & Mosher

[57] ABSTRACT

A V-belt (1) comprising at least three layers (2, 3, 4) of elastomeric material embedding discontinuous fibers (5, 6, 7); one of the layers (2) comprises fibers (5) directed transversally to the belt longitudinal direction and the two remaining layers (3, 4) comprise fibers (6, 7) mutually inclined in opposite direction with respect to the belt longitudinal direction X—X, the layers in which the fibers are inclined in the belt longitudinal direction having an equal extensibility. The three layers are in direct mutual contact and the belt is devoid of inextensible longitudinal reinforcement strands or the like. In some embodiments, the belt may be part of a two-pulley transmission, in particular for stepless speed change gears, where only one pulley is of the expanding type.

19 Claims, 8 Drawing Figures

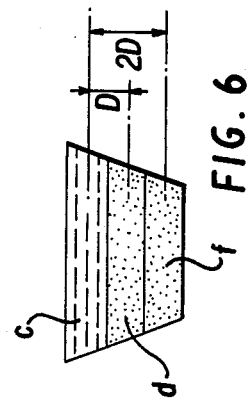
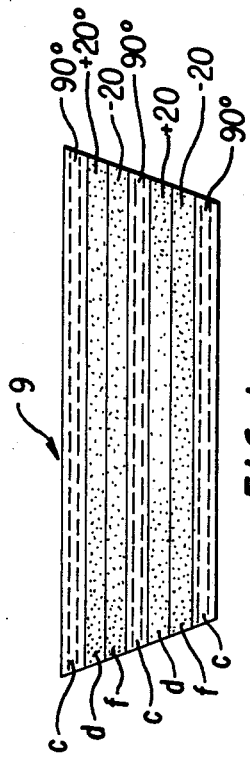
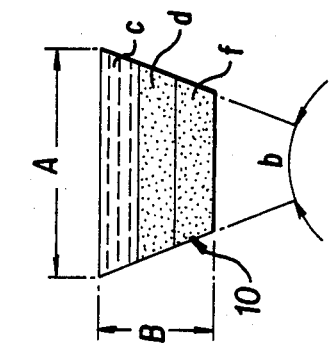
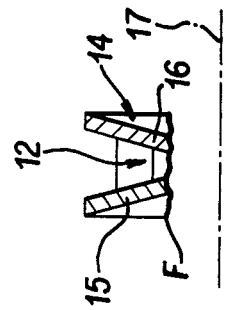
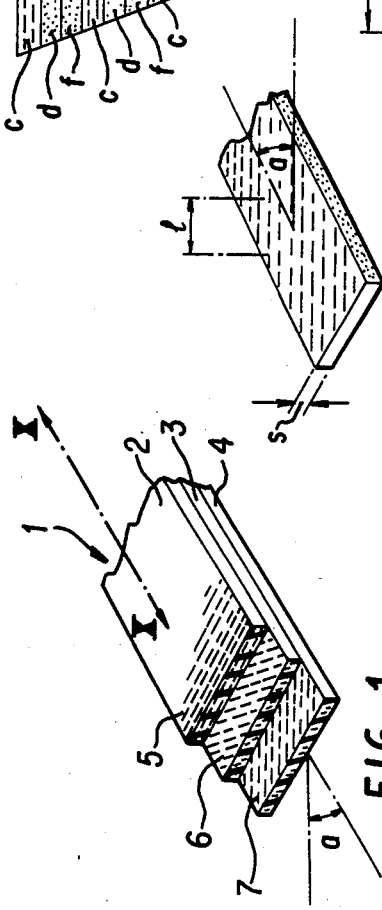
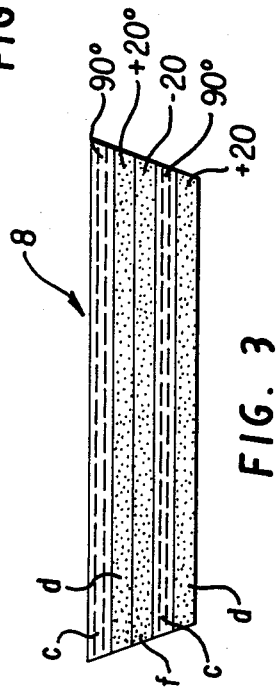
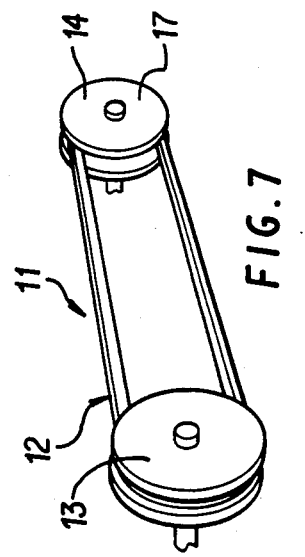

V-BELT OF CONTROLLED EXTENSIBILITY AND RELATIVE TRANSMISSION

The present invention relates to a V-belt and a related transmission, and in particular it concerns a V-belt of elastomeric material intended to be used for instance in a driving system of stepless speed change gears or in those drives where variations in the belt length can be necessary for any reason.

As known, in its more general form, a V-belt consists of a body trapezoidal in cross section and made of elastomeric material which contains a reinforcing structure mainly comprising a plurality of continuous and inextensible longitudinal inserts, in general in the form of threads, filaments, strands and the like.

A V-belt having the above indicated structure can be used in driving systems for stepless speed change gears where the belt is associated with two pulleys, each formed of two halves which can be mutually moved together or apart to form a trapezoidal race of variable depth.

During service, when the first pulley is subjected to axial thrusts, the two halves move toward each other to form a race of a reduced width, with a consequent outward radial displacement of the belt wnding arc.

The second pulley, by means of an appropriate mechanism, moves its two halves apart so that the belt takes a winding arc which extends on a smaller diameter, with a consequent availability of a greater peripheral length to compensate for the length taken by the inextensible belt on the first pulley.

These driving systems require the disadvantageous employment of two variable race pulleys, each of which is provided with complicate systems so that the half pulleys forming the V-shaped race can move toward each other or apart as needed.

Moreover, the conventional V-belt—as it contains continuous longitudinal elements embedded in the elastomeric material—has a certain disuniformity in its cross-section and this may results in a poor fatigue resistance.

In fact, the presence of continuous elements, as strands of textile material or of other material, causes a certain transversal bulk, which often prevents a good chemical bond to the elastomeric material.

Unfortunately, the simultaneous presence of nonuniform material can give rise in course of time to the phenomenon of ply separation, with a consequent insufficient resistance of the whole belt body to the various stresses suffered during use.

Further, it is to be taken into account that the various strands, initially arranged side-by-side in a well defined belt plane corresponding to the neutral axis, are subjected in use—namely when the belt is pushed into the pulley race—to a possible misalignment, with an undesired greater concentration of stresses on some strands rather than on others.

Other employments are known, in which a V-belt is associated with two pulleys under a certain pre-tension degree.

In these systems, one of the two pulleys, usually that associated with a motor block, is arranged on a support having a special slot.

In a further step, the belt is mounted between the pulleys which are maintained at a certain axial distance, and then the support of one of the pulleys is moved along the slot to obtain the desired pre-tension of the belt.

This solution is not satisfactory, owing both to the need of repeating a manual operation in an industrial setting, and that energy consuming parts not strictly necessary for the driving system are needed.

Further, it is to be noted that the conventional V-belts may show a certain instability in the sidewall zone, due to the compression action exerted by the pulley sides.

Obviously, in a V-belt, transversal instability is to be avoided, since it causes ply separation during the course of time.

Consequently, the present invention aims at providing a V-belt and an associated transmission in which the above mentioned disadvantages are not present.

Accordingly, an object of the present invention is a V-belt, characterized in that it comprises along its longitudinal direction at least one group of three layers of elastomeric material embedding discontinuous fibers, one of said layers having fibers directed transversally to the belt longitudinal direction and the two remaining layers having fibers with inclined in mutually opposite directions with respect to the belt longitudinal direction, the angle of inclination of the fibers with said longitudinal direction being at most 45°, the Young's moduli of the layers comprising said inclined fibers—measured in the belt longituninal direction—being equal to one another, each of the layers—at least on one face—being bonded to another of the two remaining layers, and the belt being devoid of continuous inextensible reinforcements along its whole length.

The present invention will be be better understood from the following detailed description given only by way of non-limiting example and made with reference to the figures of the attached sheet of drawings, in which:

FIG. 1 is a partial perspective view of the belt according to the invention,

FIG. 2 is a partial perspective view of one of the three main layers of the belt of FIG. 1, FIGS. 3 to 6 show, in cross section, some embodiments of the invention, FIG. 7 illustrates a transmission for stepless speed change gears comprising a belt as shown in the preceding figures with only one pulley with a trapezoidal groove and of variable transversal size, and FIG. 8 shows a variable race pulley in partial cross section.

In FIG. 1, reference numeral 1 indicates a V-belt comprising three layers 2, 3 and 4, each of which contains discontinuous fibers 5, 6, 7 embedded into it and substantially arranged along only one well defined direction with respect to the belt longitudinal direction X—X corresponding to its maximum length.

In the example of FIG. 1 the fibers 5 of layer 2 are substantially directed in the belt transversal direction and the fibers 6 and 7 of layers 3, 4 are substantially inclined, with respect to the belt longitudinal direction, at angles "a" which are equal to 45°.

In the present specification the expression "fibers substantially directed" and "fibers substantially inclined" mean that the fibers 5 form an angle of 90° with respect to the belt longitudinal axis, with possible angle variations ranging from 85° to 95°, and that the inclination of the fibers of layers 3, 4 may vary by more or less 5° respect to the selected angle "a" between the fibers.

Moreover, there is a correlation between the fibers and the layers where they are embedded, which is expressed by the following relation:

$$S = 1$$

where (FIG. 2)

"S"—is the thickness of any whichever layer,
"1"—is the value of the fiber average length, namely the length determined by the greater number of fibers present in the layer and having a certain length value.

The fibers may have a length ranging between 0.5 mm and 5 mm and a diameter ranging between $10\mu$ and $400\mu$ (micron).

As can be seen in FIG. 1, the main feature of the present invention is the fact of having chemically bonded each layer, on at least one of its faces, to the two remaining layers, without the interposition of further layers containing fibers directed differently from what is specified, or of further layers of elastomeric material.

In other words, in all the embodiments deriving from the present inventive principle, the three layers of belt 1 are intimately bonded together through cross-linking of the elastomeric material in such a way that the fibers of the same layers constitute in the whole a reinforcing structure characterized by triangles whose sides cross directly to one another to form triangle vertices.

As it can be noted from FIG. 1, the belt is characterized by the total absence of continuous and inextensible longitudinal reinforcements in the form of strands, threads, filaments and the like, as usually found in V-belts.

In other words, conventional V-belt are characterized by the presence a neutral axis pre-established by the plane containing the continuous and inextensible longitudinal reinforcements while such a pre-established neutral axis is not present in the belt according to the present invention.

Therefore, conventional belts remain inextensible in any load condition and in any operation of the driving system, since the position of the neutral axis defined by the longitudinal insertion remains unchanged; on the contrary, the belts according to the present invention are characterized by the possibility of varying the neutral axis as a function of load, so that a gradual elongation can be obtained, controlled however by the triangular structure embedded in the elastomeric material.

As regards the possibility of elongation of belt 1 and its relative value, both the percentage of fibers present in the layer and the hardness of the elastomeric material are to be taken into consideration.

In general, the percentage by weight of the fibers present in each layer—referred to 100 parts by weight of rubber—may range between 10 and 50 and the rubber hardness between 60 and 90 Shore A.

In particular, as regards the belt structure, the fibers position and percentage and the material used are so selected that Young's modulus or stretch modulus, measured in the belt longitudinal direction, is substantially uniform for the whole belt cross section and, in the preferred embodiments, is characterized by a value lower than, or at the most equal to, $100 \text{ Kg/mm}^2$.

As known, the expression "Young's modulus" means a ratio "E" between the unitary tension (in $\text{Kg/mm}^2$) and the corresponding unitary longitudinal deformation; the value "E", for a given material, represents the slope of the linear portion of the loads/deformation curve in a Cartesian system, where the loads are reported on the ordinates and the deformations on the abscissae.

As regards the belt's ability to endure a controlled elongation in a driving system, for instance a stepless speed change gear, consideration must be had to the value of the initial angle "a" of fibers 6, 7 of layers 3, 4 as a function of the belt tensile stress and the cross link of fibers 5 of layer 2.

Said fibers 5, being compression resistant are charged with the shearing stresses due to the variations of angle "a" between the directions of the fibers belonging to layers 3, 4 and, reacting to the shear strain, prevent any collapse of the rubber and any detachment of the adjacent layers from the belt.

The reinforcing structure, formed by a plurality of triangles as described above, can be obtained with different materials.

The fibers, preferably embedded and oriented in the belt layers by a calendering process, can be made of different materials, i.e. natural such as cotton, mineral such as glass, textile such as the aramidic resins known as Kevlar (registered trademark), or the polyamide resins such as nylon, or other inextensible materials such as polyester or rayon, or in the form of discontinuous inextensible metallic or non-metallic elements whose inextensibility characteristics—with respect to the elastomeric material embedding them—suggest their use as a reinforcing structure for each layer 2, 3, 4.

In the most general embodiment of the present invention, the layers may have a different thickness and the fibers 6, 7 of layers 3, 4 may be made of different material, for instance the first mineral and the second textile; moreover, the fibers of one layer—even if they are inclined in a direction opposite to those of the other layer with respect to the belt longitudinal direction—may have angles of inclination of different value, provided that in any embodiment the fibers and the angles of inclination of the two layers 3, 4 bonded to the elastomeric material used, are such that the stretch modulus of layer 3—measured in the belt longitudinal direction—is equal to that of layer 4.

Preferably, this equality between the moduli of layers 3, 4 necessary to ensure a correct elongation of the belt, is obtained by means of fibers of equal material and by equal opposite angles "a".

According to an embodiment of the invention, the fibers of the three layers 2, 3, 4 are made of Kevlar and the equal angles of the two layers can be initially selected according to a range of values between 45° and 0°, and preferably in a range of values between 15° and 22°.

In a more specific example, the Kevlar fibers may have an average length of 0.4 mm.

The belt according to the invention may comprise a number of layers different from that represented in the figures; said layers, however, must always have the triple arrangement shown in FIG. 1, namely one must have transversal fibers and two must have fibers inclined in an opposite sense with respect to the belt longitudinal direction.

Consequently, the belts can be formed by a plurality of superimposed groups, each of which contains a triple arrangement of layers 2, 3, 4 as represented in FIG. 1.

The number of layers of each group can be other than three, since two successive groups may have a common layer.

For instance, if the 90° layer is indicated with "c" and the layers having the fibers inclined at opposite angles with respect to the belt longitudinal direction are indicated with "d" and "f", a belt can be obtained having two group of layers, as the belt 8 shown in FIG. 3.

In this embodiment, the layer "f" is common both to the first and to the second group forming the belt cross section.

In fact said layer "f"—comprising fibers directed for instance at—20°—is intimately connected to the upper layers "d" and "c" and to the lower layers "c" and "d".

At it can be noted, the belt 8 is characterized in that it comprises five layers.

In this case, to have a uniform resistance of the belt cross section, layer "f" must have a greater thickness and must contain a larger number of fibers with respect to the other upper and lower layers "c" and "d".

FIG. 4 represents a further embodiment concerning a belt 9 comprising three groups, in which layers "f" and "d" are common both to the second and the third.

Preferably—however—the selected belts comprise a plurality of groups each having three layers of equal thickness and fibers all made of the same material, in particular Kevlar.

A further embodiment of a belt 10 is illustrated in FIG. 5, in which:

A is the width of the outermost upper layer, having values ranging from 10 to 15 mm, B is the belt height, having values ranging from 5 to 7 mm, "b" is the angle between the trapezium sides, having a value of 34°±15.

The belt layers may have a thickness of 0.6 mm; in layers "c", "d", "f" the fibers are arranged as already explained in respect of the preceding figure.

Belt 10—instead of one group—may comprise three groups, each of which is formed by three layers repeating the first group in the same order, namely:

| c - d - f | c - d - f | c - d - f |
| --- | --- | --- |

Further equivalent solutions can be those reported herebelow, in which the sequence of the layers is changed, namely:

| - c f d | - c f d | - c f d |
| --- | --- | --- |
| - d c f | - d c f | - d c f |
| - d f c | - d f c | - d f c |

In further particular embodiments, belt 10 might have of course a number of groups greater than three, for instance four, or twelve, or twenty and even more.

In all the above indicated solutions—for the purposes of the invention—it is necessary to comply with the condition that one of the layers, whichever it may be, is adhesive on both sides opposite to the two remaining layers.

In particular, when the layers have an equal thickness "s" (FIG. 6), and D indicates the distance between the median planes of two contiguous layers, it is necessary to comply with the condition that layer "c", having fibers at 90°, is at the most distant from the not adjacent layer by the double of thickness "s".

The above indicated condition permits to bond—as desired—the transversal fibers to the fibers inclined at an angle "a" which are embedded in the remaining layers of a same group of the belt.

The object of the present invention can find a practical application in all the driving systems in which a variation in the belt length is required, in particular in the driving systems in which the belt works under tension or the neutral axis is external to the belt body.

For instance, this belt might be used in a washing machines in which the motor block of one pulley must be moved along a suitable slot to allow for the introduction of the V-belt between the two pulleys of the drive.

By means of the present invention, it is possible to avoid the provision of the slot and the consequent manual operation, since the belt according to the invention, being devoid of any longitudinal reinforcement, is extensible and therefore, owing to its elastomeric elongation, can be easily mounted between two pulleys situated at a certain distance.

Still in particular, the present belt can be used for stepless speed change gears to obtain transmission in which one pulley has a "V" race of variable transversal dimensions, namely drives for stepless speed change gears in which one of the pulleys has a fixed diameter and the other a variable diameter.

The transmission illustrated in FIG. 7 may comprise a V-belt 12 as described above and two pulleys 13 and 14, the first of larger diameter, with a trapezoidal race having a constant transversal dimension, and the second of smaller diameter, in which the belt is more or less wedged, remaining subjected to elongations due to load.

The pulley 14 is substantially made of two portions 15 and 16—as shown in FIG. 8—which can be narrowed and widened along axis 17 as a function a force F.

During operation of the drive 11, when force F causes the approach of portions 15, 16 toward each other and the belt 12 is moved to a radially outermost position in the race of pulley 14 so that it, to fit with the greater peripheral length of said race, is subjected to an elongation.

In the new winding position on pulley 14, the belt 12 takes a greater peripheral speed which is transmitted to the pulley 13 of greater diameter.

In an embodiment of the invention, the pulley 14 might be as that described in the Italian Patent Application No. 24 579 A/82.

The present invention achieves the desired aim. In fact, the belt structure is devoid of continuous longitudinal reinforcement elements such as strands, threads and the like in any of its parts and comprises a resistant structure whose main elements are fibers or pieces of materials equivalent to fibers as regards size and resistance, embedded in elastomeric material.

In practice of the invention, owing to the geometrical dimensions of the fibers and their discontinuity and to the elasticity of the elastomeric material embedding them, it can be said that the belt resistant section—with respect to the conventional V-belt—is characterized by a high degree of elasticity.

Consequently, the present belt is perfectly suitable for those transmissions where it is desired to have two pulleys at a fixed mutual distance and an initial prestretching of the belt mounted between them.

In fact, in this case, even if the belt has a length smaller than the fixed distance between the pulleys, resort can be had to its extensibility in order to obtain its elongation and its assembling under tension between the pulleys.

Moreover, it is to be noted that the elongation of the belt as a function of a certain load is limited by the same belt structure without causing any instability.

In fact the elongation of an elastic material having a stated length usually results in a reduction of the transversal dimension to which corresponds a compression load able to generate a transversal instability due to the collapse of the elastic material.

This negative effect does not occur in the present belt, at least in the previously indicated range of values regarding the inclination angle "a" of the fibers in respect of the belt longitudinal direction X—X (FIG. 1).

In fact—as already said—the presence of a first layer with fibers at 90°, relative to each pair of layers with fibers inclined to the longitudinal direction, and in particular the fact that any layer is bonded to the two remaining layers of each resistant group, enables continuous control of the belt elongation.

In practice, whichever is the number of groups present in the belt, the layers at 90° withstand compression stresses, preventing the occurrence of instability, due to buckling, in the two remaining layers of the same group.

This advantageous result would not be obtained if the belt were formed by one or more groups each formed in turn only by layers comprising fibers inclined at the "a" angle.

In this instance the belt would still have extensibility characteristics but each layer, unable to withstand in particular the lateral compression stresses due to the elongation, would tend to collapse, being deformed in its own plane into an undulated configuration and facilitating therefore the separation of the adjacent layers.

The present invention is characterized in particular by a preferred embodiment comprising a plurality of groups each having three layers—substantially as shown in FIG. 1—in which the fibers form "a" angles ranging between 15° and 22°.

The upper limit of angles "a" is 45°, since above this value the longitudinal resistance of the belt is not acceptable.

Belts for particular applications, in which small elongations are required, can be made of layers whose fibers have smaller and smaller "a" angles down to a zero value; said layers, however, have always the indicated minimum distance in respect of the layer comprising 90° fibers.

The belt according to the present invention is preferably used for stepless speed change gears.

In fact the present belt structure, which allows a controlled elongation, makes possible the use of only one pulley of variable diameter instead of two variable diameter pulleys.

Therefore it can be understood that said belt, used for obtaining transmissions improved with respect to the conventional belts, is useable in a wider range of industrial applications of said stepless change gears.

In particular, these belts comprise a structure whose stretch moduli have values variable in accordance with the selected angle "a".

By way of example, the Applicant indicates that in the belts comprising 6 groups each formed by three layers, the longitudinal stretch moduli, measured in any area of the belt cross section, may vary from a value of 1.7. Kg/mm$^2$ for an angle "a" of 40° to a value of 6.3 Kg/mm$^2$ for an angle "a" of 20°, and may reach a value of about 17 Kg/mm$^2$ for angles "a" near to zero.

Although some particular embodiments of the present invention have been described and illustrated, the invention includes within its field all the possible embodiments understandable to a technician skilled in that field; for example, the material embedding the fibers can be polyurethane or neoprene or a visco-elastic material as used in the drives between belts and pulleys.

Also, the belt could comprise one or more layers of rubber not interposed between three main layers of each resistant group; for instance the belt of FIG. 1 could include a further rubber layer arranged in a lower position and adjacent to layer 4.

What is claimed:

1. An elastically extensible V-belt, of variable length comprising, along the length of the belt, a plurality of groups of elastomeric layers, each group being formed by three layers in which are embedded discontinuous fibers, one of said layers having fibers directed transversally to the longitudinal direction of the belt; the other two layers having fibers inclined in mutually opposite directions with respect to the longitudinal direction of the belt, the angle of inclination of the fibers of said other two layers to said longitudinal direction being at most 45°; the fibers of the three layers of each group forming a reinforcing structure comprising a plurality of triangles whose sides meet one another substantially in direct contact thus determining the vertices of the trangles; the Young's moduli of the layers of each group having said inclined fibers, measured in the longitudinal direction of the belt, being equal to each other and the Young's modulus of the belt being substantially uniform across the transversal section; said elastomeric layers and embedded discontinuous fibers constituting the only longitudinal reinforcement of said belt, said belt thus being devoid for its entire length of longitudinal, continuous and inextensible reinforcements such as cords, wires, filaments so that the entire cross-sectional area of said belt is always working under traction; said layers having transversal fibers acting to control the stability of the belt in the pesence of transversal contractions in the belt when subjected to elastic elongation.

2. The V-belt of claim 1 in which the fibers of said other two layers are of the same material and the fibers of the two layers are symmetrically inclined to each other with respect to the longitudinal direction of the belt.

3. The V-belt of claim 1 in which the layer having transversal fibers is positioned intermediate with respect to the other two layers.

4. The V-belt of claim 1 in which the layer having transversal fibers is positioned outermost with respect to the other two layers.

5. The V-belt of claim 1 in which the thickness of each layer is at most equal to the average length of said embedded discontinuous fibers.

6. The V-belt of claim 1 in which the Young's modulus measured in the longitudinal direction of the belt is substantially constant over the length of the belt.

7. The V-belt of claim 6 in which the Young's modulus is less than 100 Kg/mm$^2$.

8. The V-belt of claim 1 having no neutral axis.

9. A transmission comprising at least two pulleys each having a groove of trapezoidal cross section and a driving system between the pulleys with an elastically extensible V-belt of variable length comprising, along the length of the belt, a plurality of groups of elastomeric layers, each group being formed by three layers in which are embedded discontinuous fibers, one of said layers having fibers directed transversally to the longitudinal direction of the belt; the other two layers having fibers inclined in mutually opposite directions with respect to the longitudinal direction of the belt, the angle of inclination of the fibers of said other two layers to said longitudinal direction being at most 45°; the fibers of the three layers of each group forming a reinforcing structure comprising a plurality of triangles whose sides meet one another substantially in direct contact thus determining the vertices of the triangles; the Young's moduli of the layers of each group, having said inclined fibers, measured in the longitudinal direction of the belt, being equal to each other and the Young's modulus of the belt being substantially uniform across the transversal section; said elastomeric layers and embedded discontinuous fibers constituting the only longitudinal reinforcement of said belt, said belt thus being devoid for its entire length of longitudinal, continuous and inextensible reinforcements such as cords, wires, filaments so that the entire cross-sectional area of said belt is always working under traction, and said layers having transversal fibers acting to control the stability of the belt in the presence of transversal contractions in the belt when subjected to elastic elongation.

10. The transmission of claim 9 in which one of the pulleys has means to vary the width of the transversal cross section of the groove so that said belt will be presented with a varying pulley circumference.

11. An elastically extensible V-belt, of variable length comprising, along the length of the belt, at least ten layers of elastomeric material, each layer having discontinuous fibers embedded therein at varying angles to the longitudinal direction of the belt, said at least ten layers having their discontinuous fibers arranged in order at the approximate angles of 90°, +20°, −20°, 90°, +20°, −20°, 90°, +20°, −20°, 90°, said order being from the radial outer to the radial inner layers, said layers forming a plurality of groups of elastomeric layers, each group being formed by three layers, each of said groups having one of said layers with fibers directed at approximately 90° to the longitudinal direction of the belt and the other two layers having fibers inclined at approximately 20° in mutually opposite directions with respect to the longitudinal direction of the belt; the fibers of the three layers of each group forming a reinforcing structure comprising a plurality of triangles whose sides meet one another substantially in direct contact thus determining the vertices of the triangles; the Young's moduli of the layers of each group having said inclined fibers, measured in the longitudinal direction of the belt, being equal to each other, and the Young's modulus of the belt being substantially uniform across the transversal section; said elastomeric layers and embedded discontinuous fibers constituting the only longitudinal reinforcement of said belt, said belt thus being devoid for its entire length of longitudinal, continuous and inextensible reinforcements such as cords, wires, filaments so that the entire cross-sectional area of said belt is always working under traction; said layers having transversal fibers acting to control the stability of the belt in the presence of transversal contractions in the belt when subjected to elastic elongation.

12. The V-belt of claim 11 in which the fibers of said other two layers are of the same material and the fibers of the two layers are symmetrically inclined to each other with respect to the longitudinal direction of the belt.

13. The V-belt of claim 11 in which the thickness of each layer is at most equal to the average length of said embedded discontinuous fibers.

14. The V-belt of claim 11 in which the Young's modulus measured in the longitudinal direction of the belt is substantially constant over the length of the belt.

15. The V-belt of claim 14 in which the Young's modulus is less than 100 Kg/mm$^2$.

16. The V-belt of claim 11 having no neutral axis.

17. An adjustable speed transmission comprising at least two pulleys each having a groove of trapezoidal cross section, only one of said at least two pulleys having means to vary the diameter of said pulley and a driving system between the pulleys comprising an elastically extensible V-belt of variable length comprising, along the length of the belt, a plurality of groups of elastomeric layers, each group being formed by three layers in which are embedded discontinuous fibers, one of said layers having fibers directed transversally to the longitudinal direction of the belt; the other two layers having fibers inclined in mutually opposite directions with respect to the longitudinal direction of the belt, the angle of inclination of the fibers of said other two layers to said longitudinal direction being at most 45°; the fibers of the three layers of each group forming a reinforcing structure comprising a plurality of triangles whose sides meet one another substantially in direct contact thus determining the vertices of the triangles; the Young's moduli of the layers of each group, having said inclined fibers, measured in the longitudinal direction of the belt, being equal to each other and the Young's modulus of the belt being substantially uniform across the transversal section; said elastomeric layers and embedded discontinuous fibers constituting the only longitudinal reinforcement of said belt, said belt thus being devoid for its entire length of longitudinal, continuous and inextensible reinforcements such as cords, wires, filaments so that the entire cross-sectional area of said belt is always working under traction, and said layers having transversal fibers acting to control the stability of the belt in the presence of transversal contractions in the belt when subjected to elastic elongation, the arrangement being such that said elastically extensible belt will travel a longer or shorter path on said pulley of variable diameter so as to vary the speed of said transmission.

18. A transmission comprising at least two pulleys each having a groove of trapezoidal cross section and a driving system between the pulleys with an elastically extensible V-belt of variable length comprising, along the length of the belt, a plurality of groups of elastomeric layers, each group being formed by three layers in which are embedded discontinuous fibers, one of said layers having fibers directed transversally to the longitudinal direction of the belt; the other two layers having fibers inclined in mutually opposite directions with respect to the longitudinal direction of the belt, the angle of inclination of the fibers of said other two layers to said longitudinal direction being at most 45°; the fibers of the three layers of each group forming a reinforcing structure comprising a plurality of triangles whose sides meet one another substantially in direct contact thus determining the vertices of the triangles; the Young's moduli of the layers of each group, having said inclined fibers, measured in the longitudinal direction of the belt, being equal to each other and the Young's modulus of the belt being substantially uniform across the transversal section; said elastomeric layers and embedded discontinuous fibers constituting the only longitudinal reinforcement of said belt, said belt thus being devoid for its entire length of longitudinal, continuous and inextensible reinforcements such as cords, wires, filaments so that the entire cross-sectional area of said belt is always working under traction, and said layers having transversal fibers acting to control the stability of the belt in the presence of transversal contractions in the belt when subjected to elastic elongation, only one of said at least two pulleys having means to vary the diameter thereof so that said elastically estensible belt will travel a longer or a shorter path on said one pulley to thereby vary the speed of said transmission.

19. An elastically extensible V-belt, of a variable length comprising, along the length of the belt, a plurality of groups of elastomeric layers, each group being formed by three layers in which are embedded discontinuous fibers, one of said layers having fibers directed transversally to the longitudinal direction of the belt; the other two layers having fibers inclined in mutually opposite directions with respect to the longitudinal direction of the belt, the angles of inclination of the fibers of said other two layers to said longitudinal direction being at most 45°; the fibers of the three layers of each group forming a reinforcing structure comprising a plurality of triangles whose sides meet one another substantially in direct contact thus determining the vertices of the triangles; the Young's moduli of the layers of each group having said inclined fibers, measured in the longitudinal direction of the belt, being equal to each other and the Young's modulus of the belt being less than 100 kg/mm$^2$ and substantially uniform across the transversal section and along the entire length of the belt; said elastomeric layers and embedded discontinuous fibers constituting the only longitudinal reinforcement of said belt, said belt thus being devoid for its entire length of longitudinal, continuous and inextensible reinforcements such as cords, wires, filaments so that the entire cross-sectional area of said belt is always working under traction; said layers having transversal fibers acting to control the stability of the belt in the presence of transversal contractions in the belt when subjected to elastic elongation.

* * * * *